United States Patent
Wada

[15] 3,682,058
[45] Aug. 8, 1972

[54] ELECTRONIC SHUTTER FOR SINGLE-LENS REFLEX CAMERA

[72] Inventor: Yasuhiro Wada, Tokyo, Japan

[73] Assignee: Kabushiki Kaisha Koparu, Tokyo, Japan

[22] Filed: Nov. 30, 1970

[21] Appl. No.: 93,717

[30] Foreign Application Priority Data

Dec. 3, 1969 Japan..................44/96923

[52] U.S. Cl....................................95/10 ST, 95/42
[51] Int. Cl..............................G01j 1/00, G01j 1/52
[58] Field of Search........95/42, 10 CT, 10 ST, 10 DT

[56] References Cited

UNITED STATES PATENTS 3,324,779  6/1967  Nobusawa et al........95/10 ST
3,349,678  10/1967  Suzuki et al..............95/10 ST Primary Examiner—Samuel S. Matthews
Assistant Examiner—Richard A. Wintercorn
Attorney—Cushman, Darby & Cushman

[57] ABSTRACT

Prior to taking a photograph, there is performed charging up or storing action of the second capacitor of the second integral circuit while the first integral circuit having a photoelectric element is being actuated. Since arrangement is provided so that "mirror lifting" is to be prevented during this storing period by an electromagnet intended for mirror holding with no direct association with the mechanical release of the shutter, the storing can be performed perfectly without stopping halfway even when the object to be photographed is of such an insufficient brightness as requiring a prolonged time for the storage. In the actual photography, the potential held by the second capacitor is compared with the potential of the third capacitor of the third integral circuit adapted to be actuated simultaneously with the starting of photography. The shutter blades are controlled by a transistorized switching circuit which is adapted to be actuated in association with this comparison of potentials.

5 Claims, 2 Drawing Figures

ELECTRONIC SHUTTER FOR SINGLE-LENS REFLEX CAMERA

BACKGROUND OF THE INVENTION

1. Field of the Invention

The present invention concerns an electronic shutter for single-lens reflex camera, and more particularly, it relates to an improvement in electronic shutter of the type described, characterized by the fact that the shutter is equipped with an electronic circuitry for controlling the holding of the mirror.

2. Description of the Prior Art of the prior art

When it is intended to apply an electronic shutter to a conventional single-lens reflex camera utilizing the so-called TTL (Through The Lens) light-measuring system, it is necessary that the brightness of the object to be photographed be stored in a control circuit before lifting up the mirror. For this reason, there have been proposed various storing circuitries for performing the aforesaid storing action. Some examples of such storing circuitries are described in the specifications of the Japanese Patent Application No. 65349/1967 filed Oct. 11, 1967 and another Japanese Patent Application No. 65423/1969 filed on Aug. 18, 1969, both by the same applicant as that of the present application. These prior storing circuitries may be briefly described as follows. Each of these circuits comprises a first integral circuit (which covers both the charge up type and the discharge type) having a photoelectric element intended for detecting the brightness of the object to be photographed through the lens system, a second circuit having a storing element and a third circuit. The capacitor of the second circuit is charged up (or discharged) for the length of time which is determined by the first circuit in accordance with the intensity of the brightness of the object to be photographed. During this part of operation, the potential which has thus charged up (or discharged) is held as it is. Then, pursuant to the opening action of the shutter blades (which, in the instance of the focal plane shutter, means the forward curtain) which takes place following the "mirror lifting" action, a capacitor of the third circuit is charged up (or discharged). The resulting potential of this capacitor is compared with the potential of the capacitor of the second circuit to thereby actuate a transistorized switching circuit to close the shutter blades (which, in the instance of the focal plane shutter, means the rearward curtain) by the potential resulting from this comparison.

In such an electronic shutter, the length of time for charging up (or discharging) the capacitor of the aforesaid second circuit, or in other words, the length of time required for the storage, is varied by the intensity of brightness of the object to be photographed. However, in a single-lens reflex camera, the length of time following the starting of the shutter release operation till the mirror is actually lifted up is indeed very short, usually a matter of moments, and this very short length of time is usually designed to be constant in substantially all of such cameras. Accordingly, in case an electronic shutter of the TTL light measuring system is incorporated in a camera of this type, it should be understood that the very short, but substantially constant length of time following the closure of the power switch during the initial stage of the shutter release operation, till the time in which the release operation advances further and the lighting up of the mirror is effected will serve as the length of time for enabling the storing action to be performed. For this reason, there should be no problem at all if the intensity of brightness of the object to be photographed is strong enough and if the aforesaid storage or charging up (or discharging) is completed during the said very short certain length of time. However, when the brightness of the object to be photographed lessens in intensity and when, accordingly, a prolonged length of time for the storage of such a condition of the object is required, the completion of this storing action will require a length of time which is greater than the aforesaid very short length of time. In such a case, this storage cannot be performed completely. As a result, the mirror is lifted up in the midst of the storing action, resulting in the inconvenience that the photograph will be underexposed.

SUMMARY OF THE INVENTION

It is, therefore, an object of the present invention to provide an electronic shutter having a circuitry for controlling the mirror holding, said controlling circuitry comprising an electromagnet provided in association with a second circuit and capable of releasing the rest state of the mirror, so that this electromagnet is actuated in association with the completion of the storing action of a second circuit to thereby effect the lifting up of the mirror upon completion of the said storing action.

Another object of the present invention is to provide various types of electronic circuitries for being connected to the second circuit and intended for controlling the holding of the mirror.

A better understanding of the present invention will be obtained by reading the following detailed description of the preferred embodiments when taken in conjunction with the accompanying drawings.

DESCRIPTION OF THE PREFERRED EMBODIMENTS

Figure 1:
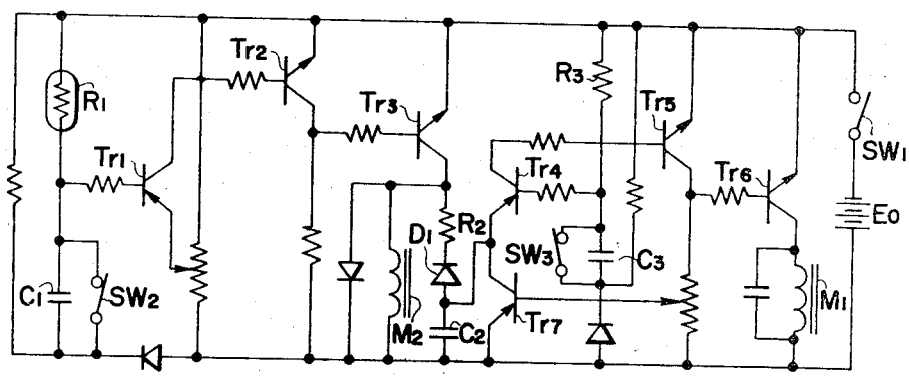
FIG. 1 is an electronic circuitry representing one embodiment of the present invention.

In FIG. 1, the symbol $R_1$ represents a photoconductive element such as CdS for detecting the intensity of brightness of the object to be photographed through the photographic lens system. This photoconductive element $R_1$ may be substituted by photogalvanic element such as Se. In such a case, this photogalvanic element may be used either independently or in combination with some other semiconductor element. Accordingly, those matters which are described with respect to photoconductive elements may be accomplished also by the use of photogalvanic elements. $C_1$ represents a capacitor having a switch $SW_2$ which is connected in parallel therewith. This capacitor $C_1$, together with the photoconductive element $R_1$, constitutes a first integral circuit. $Tr_1$ represents a switching transistor whose switching action (from "off" to "on") is controlled by the first integral circuit. $Tr_2$ and $Tr_3$ represent amplifying transistors, respectively, which are connected in series with the output terminal of the switching transistor $Tr_1$. The main amplifying transistor $Tr_3$ is adapted to be rendered "on" while the switching transistor $Tr_1$ remains "off." $R_2$ and $C_2$ represent a resistor and a capacitor, respectively, which are connected to the collector electrode of the transistor $Tr_3$ and which jointly constitute a second integral circuit. This second integral circuit is rendered operative while the transistor $Tr_3$ remains conductive. A diode $D_1$ is connected with the second integral circuit to prevent the discharge of the capacitor $C_2$, so that this second integral circuit has storing capability. $R_3$ and $C_3$ represent a resistor and a capacitor, respectively, which jointly constitute a third integral circuit. This third integral circuit is rendered operative by the opening of a switch $SW_3$ which is connected in parallel with said capacitor $C_3$. $Tr_4$ represents a switching transistor whose emitter potential is controlled by the capacitor $C_2$ and whose base potential is controlled by the capacitor $C_3$. $Tr_5$ and $Tr_6$ represent amplifying transistors, respectively, which are connected in series with the output terminal of the switching transistor $Tr_4$. An electromagnet $M_1$ for controlling the closing action of the shutter blades (which, in the instance of the focal plane shutter, means rearward curtain) is connected to the collector electrode of the main amplifying transistor $Tr_6$. $Tr_7$ represents a transistor which is connected, for positive feedback, with the switching transistor $Tr_4$. $M_2$ represents an electromagnet connected with the collector electrode of the main amplifying transistor $Tr_3$ and intended for holding the mirror. This electromagnet $M_2$ is operative in such a way that, so long as it is energized, it electromagnetically holds the mirror (not shown) in its rest position which means the position, at which the photographic lens system is aligned with the finder system, so that, whenever the electromagnet $M_2$ is de-energized, its action of holding the mirror is relieved as a result of its being de-energized. $E_0$ represents a power source, and $SW_1$ represents a power switch.

Description will next be directed to the operation of the circuitry of the present invention in connection with the embodiment of FIG. 1. Let us now assume that the switch $SW_2$ which is connected in parallel with the capacitor $C_1$ is opened during the initial stage of shutter release operation. The first integral circuit which is composed of the photoconductive element $R_1$ which is exposed to the light coming from the object to be photographed and also of the capacitor $C_1$ is now ready for actuation. When the power switch $SW_1$ is closed during a still more advanced stage of the shutter release operation, the first integral circuit is rendered operative. Along with this, the respective transistors are rendered to the following state i.e. the transistor $Tr_1$ is rendered "off," the transistor $Tr_2$ is rendered "off," $Tr_3$ is rendered "on," $Tr_4$ is rendered "off," Transistor $Tr_5$ is rendered "off," Transistor $Tr_6$ is rendered "on" and transistor $Tr_7$ is rendered "off." As a result, an electric current is allowed to flow through the coil of the electromagnet $M_1$ which is connected to the collector electrode of the transistor $Tr_6$ so that the closing action of the shutter blades (which, in the instance of the focal plane shutter, means the rearward curtain) is electromagnetically locked. During this part of operation, the second integral circuit which is composed of the resistor $R_2$ and the capacitor $C_2$ which are connected to the collector electrode of the transistor $Tr_3$ is also rendered operative. Accordingly, throughout the operating period of the first integral circuit, i.e., throughout the period in which the state of the transistor $Tr_1$ is switched from "off" to "on" in accordance with the intensity of brightness of the object to be photographed and in which the state of the transistor $Tr_3$ is thereby reversed from "on" to "off," the capacitor $C_2$ of the second integral circuit is continuously charged through the resistor $R_2$. Along with this, the emitter electrode of the transistor $Tr_4$ is provided with a potential which is proportionate to this charging time. Since this potential of the capacitor $C_2$ is retained by the diode $D_1$ which is intended for preventing the discharge of said capacitor, it may be said that the light or the brightness of the object to be photographed at such a moment has been stored.

When, as a result of a further advancement of the shutter release operation, the mirror is lifted up, the light coming from the object to be photographed reaches the film face, and an exposure for the purpose of photography is performed. During this part of operation, the shutter blades (which, in the instance of the focal plane shutter, means the rearward curtain) are held in their opened state by the electromagnet $M_1$ as has been stated previously. At the moment that this exposure is started, the switch $SW_3$ which is connected in parallel with the capacitor $C_3$ is opened. As a result, the third integral circuit which is composed of the resistor $R_3$ and the capacitor $C_3$ is rendered operative. Accordingly, the capacitor $C_3$ is charged up via the resistor $R_3$. Therefore, when the base potential of the transistor $Tr_4$ has become lower than the already stored potential of the capacitor $C_2$ or, in other words, than the emitter potential of the said transistor, the state of this transistor $Tr_4$ is switched from "off" to "on." At the same time, the state of the transistor $Tr_5$ is also switched from "off" to "on," whereas the state of the transistor $Tr_6$ is reversed from "on" to "off." The length of time till the occurrence of this reversion of state serves as the period for reproduction of what has been stored. With this cut-off of the conductive state of the transistor $Tr_6$, the supply of electric current to the coil of the electromagnet $M_1$ is interrupted, and as a consequence, the shutter blades (which, in the instance of the focal plane shutter, means the rearward curtain) are closed. Also, the reversion of the state of the transistor $Tr_4$ to "on" is performed swiftly because of the positive feedback connection of the transistor $Tr_7$.

The aforesaid operation of the electronic shutter having the storing ability — this operation being performed by utilizing these first, second and third integral circuits— is identical with what is described in the specifications of the previously mentioned earlier applications of the author. It should be understood, however, that the feature of the present invention lies in the fact that a circuit for controlling the electromagnet $M_2$ is additionally provided in association with the second integral circuit.

Referring now to FIG. 1 again, it will be seen that the electromagnet $M_2$ is connected to the collector electrode of the transistor $Tr_3$. It is this electromagnet $M_2$ that controls the lifting up of the mirror. Description will hereunder be directed to the controlling action of this electromagnet. Let us now assume that the power switch $SW_1$ is closed during the initial stage of the shutter release operation. Then, in the same manner as stated previously, the transistor $Tr_3$ is rendered "on" to allow an electric current to pass through the coil of the electromagnet $M_2$ which, in turn, electromagnetically holds the mirror in its position. It should be understood that, with a further advancement of the shutter release operation, the mechanical locking per se of the mirror in its lifted position is relieved. However, at this moment, the mirror is electromagnetically held in its rest position, so that the mirror continues this state of being held in its rest position. The aforesaid storing action proceeds during this state of the mirror. Since the supply of electric current to the coil of the electromagnet $M_2$ is suspended when the state of the transistor $Tr_1$ is switched from "off" to "on" by the first integral circuit, and when, accordingly, the state of the transistor $Tr_3$ is reversed from "on" to "off," the mirror is relieved of its state of being electromagnetically held in the rest position, and therefore it is lifted up. This means that the mirror is held continuously in its rest position throughout the period of the storing action and that this holding is relieved upon the completion of the storing action. Therefore, even when the object to be photographed is low in intensity of brightness and even when, accordingly, the operating time of the first integral circuit is prolonged and even when, due to this, the completion of charging up of the capacitor $C_2$ of the second integral circuit requires a prolonged time, the mirror is unfailingly lifted up after the completion of this charging. Therefore, the inconvenience which has been encountered in the prior art owing to reasons such as under-exposure is eliminated.

Figure 2:
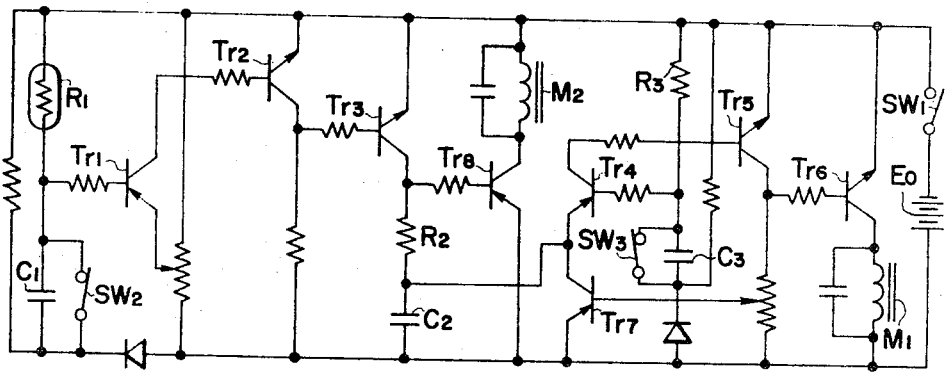
FIG. 2 is another embodiment which, in particular, is an electronic circuitry showing another type of circuit for controlling the holding of the mirror.

In the embodiment shown in FIG. 2, it should be understood that those parts which play the some role as those parts shown in the embodiment of FIG. 1 are indicated by like reference symbols. Besides, the basic behaviors of the embodiment of FIG. 2 are also identical with those of the embodiment of FIG. 1 with the exception of the action of that part of the circuit associated with the electromagnet $M_2$. Therefore, the detailed explanation of the actions of those similar parts is omitted in the following description. In FIG. 2, an electromagnet $M_2$ for controlling the mirror holding is connected with the collector electrode of a transistor $Tr_R$. In this embodiment, this transistor $Tr_R$ presents the same pattern of action ("on" or "off") with that of the transistor $Tr_3$ of the preceding embodiment. Let use now compare the embodiment of FIG. 1 with that shown in FIG. 2. It will be understood that, in the former, the second integral circuit and the electromagnet $M_2$ are directly connected in parallel with the collector electrode of the transistor $T r_3$ and that, in the latter, the second integral circuit is connected, from the collector electrode of the transistor $Tr_3$ and via the transistor $Tr_R$, to the electromagnet $M_2$. Owing to this connection, in the embodiment of FIG. 1, there can be supplied no sufficient bias current to the second integral circuit because of the fact that the impedance of the electromagnet $M_2$ is generally low. As a result, the scope of storage tends to be narrow. In the embodiment of FIG. 2, however, the impedance of the electromagnet $M_2$ as viewed from the collector of the transistor $Tr_3$ is high, and therefore, this tendency of the scope of storage to become narrow can be prevented. Also, in the arrangement of FIG. 2, the second integral circuit is hardly affected by possible voltage fluctuations.

In the behaviors explained above, description has been directed to the instance in which the release of the mirror from its rest position is performed in association with the de-energization of the electromagnet $M_2$. It should be understood, however, that it is possible to utilize the attracting force of the electromagnet $M_2$ so that the mirror may be relieved of its rest position at the time when the storing action of the second integral circuit is terminated. For example, by connecting the electromagnet $M_2$ with the collector electrode of the transistor $Tr_2$, it is possible to utilize the attracting action of this electromagnet to release the position of the mirror. In the statement made above, both the storing action and the storage reproducing action have been shown as being of the charge-up type. It is needless to say, however, that the discharge type may as equally effectively be used, this type being operative in such a manner that the capacitors $C_2$ and $C_3$ are charged priorly up to predetermined value and then the charge on the capacitor $C_2$ first is discharged for a length of time determined by the first integral circuit, and thereafter, the charge on the capacitor $C_3$ is discharged along with the opening action of the shutter blades (which, in the instance of the focal plane shutter, means the rearward curtain), followed by the comparison of the potential between the capacitors $C_2$ and $C_3$ to close the shutter blades by virtue of the potential resulting from this comparison. Moreover, it should be understood that the resistors $R_2$ and $R_3$ of the second and the third integral circuits may be substituted by photoconductive elements of other kinds which are however identical in characteristics with the photoconductive element $R_1$. In such an instance, it is desirable that the photoconductive elements of the second and the third integral circuits be arranged so as to directly detect the intensity of light coming from the object to be photographed, instead of through the photographic lens system. In actual practice, however, a single photoconductive element will serve concurrently as the respective photoconductive elements of the second and the third integral circuits. Such an example has been described in the specification of the previously mentioned Japanese Patent Application No. 65423/1969 filed by the author. It will be understood therefrom that the scope of storage, i.e., the range in which the control of exposure is possible, can be expanded.

According to the present invention, arrangement is provided so that the prevention of lifting up the mirror is electronically controlled throughout the period of time in which the condition of the brightness of the object to be photographed continues to be stored. It should be understood, however, that the present invention is not limited to those embodiments described above, but that a number of modified embodiments may be worked out by those skilled in the art without departing from the scope of the appended claims.

I claim:

1. In an electronic shutter for single-lens reflex cameras having a mirror comprising:
   a first integral circuit containing a photoelectric element disposed in the light path of the objective lens system and operable to convert the brightness of a scene to be photographed to a resistive value, a second integral circuit connected to said first integral circuit and operable to retain voltage information corresponding to the brightness of the scene to be photographed during the operation of said first integral circuit;

a reference circuit connected to said second integral circuit;

a third integral circuit connected to said second integral circuit through said reference circuit and operable to start the operation of said third integral circuit upon the commencement of photography; and an actuating circuit connected to said reference circuit and including a first electromagnet operable to control the closing action of the shutter blades by the output of said reference circuit, whereby the exposure time during the photographing is controlled by the brightness of the scene to be photographed memorized prior to the photographing, the improvement comprising, a second electromagnet connected to said second integral circuit and operable to maintain the energized state of said second electromagnet while said second integral circuit retains said voltage information; and a keeping means associated with said second electromagnet and operable to release said mirror from its downwardly held position by the de-energization of said second electromagnet, whereby said mirror may be lifted up through the operation of the shutter release by the releasing of the mirror from being kept by said keeping means at the completion of the operation of said second integral circuit.

2. An electronic shutter for single-lens reflex cameras according to claim 1, which further comprises a transistor inserted between said second integral circuit and said second electromagnet and operable to alter the impedance therebetween.

3. An electronic shutter control circuit comprising:

a first capacitor, photo-responsive means connected to said capacitor and disposed in a light path from the object to be photographed so that the resistance of said photo-responsive means varies as a function of the brightness of said object, first switch means connecting said capacitor and photo-responsive means to a source of voltage so that, when said first switch means shifts from a first to second condition, said first capacitor changes its voltage at a rate which varies as a function of the resistance of said photo-responsive means, a second capacitor, second switch means connecting said second capacitor to said voltage source and connected to said first capacitor so that said second switch means permits said second capacitor to change its voltage after said first capacitor begins to change its voltage until the voltage of said first capacitor reaches a predetermined level and, accordingly, the voltage at said second capacitor varies as a function of the object brightness, means connected to said second capacitor for causing said second capacitor to retain the voltage until said second switch means prevents further voltage changes, means connected to said second switch means for holding a mirror in the photographing path until said switching means prevents said second capacitor from further changing its voltage, a third capacitor, third switch means connected to said third capacitor for preventing said third capacitor from changing its voltage until said holding means no longer holds said mirror, means for comparing the voltages of said second and third capacitors and producing a given signal when the voltages have a predetermined relationship, means for holding the shutters open, fourth switch means connected to said holding means and to said comparing means for causing said holding means to release said shutters when said comparing means produces said given signal.

4. A circuit as in claim 3 wherein said second capacitor retaining means includes a diode connected in series with said second capacitor.

5. A circuit as in claim 3 wherein said second switching means includes a transistor.

* * * * *